6969X
S. Willard,
Making Laths.
Patented Mar. 16, 1832.
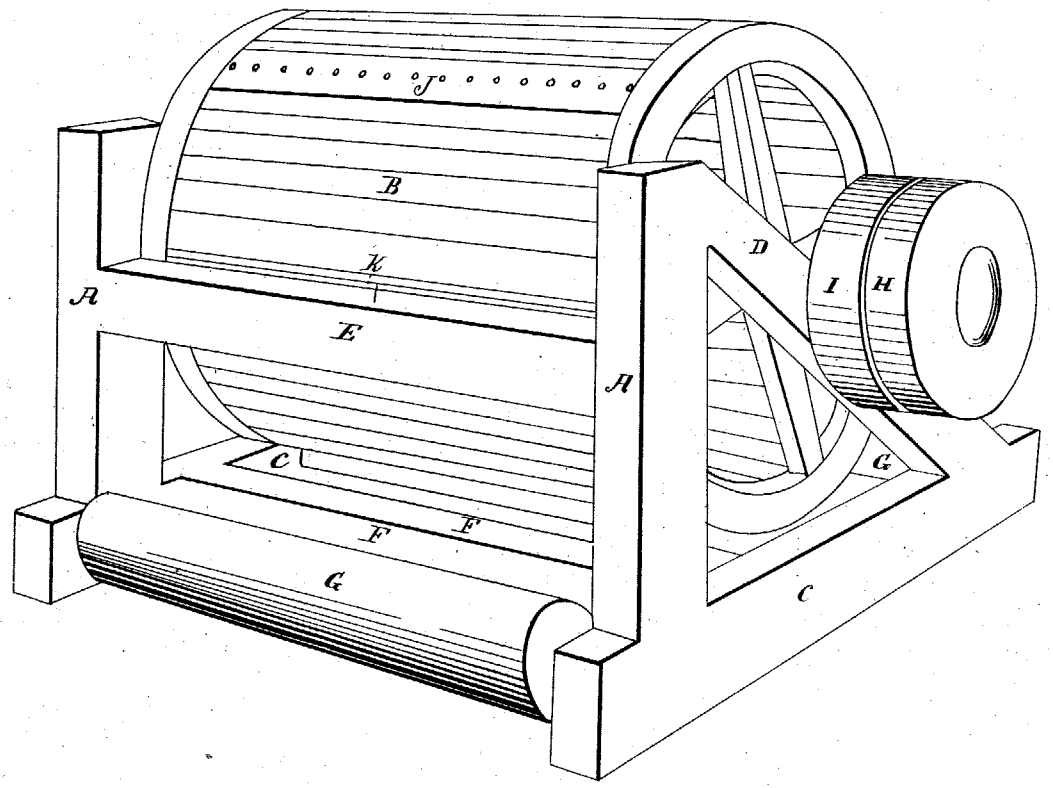
AM. PHOTO-LITHO. CO. N.Y. (OSBORNE'S PROCESS.)

X 6969

March 16. 1832

Simon Willard of Cincinnati Ohio
Letters Patent

The Schedule referred to in these Letters Patent, and making part of the same containing a description in the words of the said Simon Willard himself of his improvement in the new and useful Revolving Lath Cutter

---

To all to whom these presents shall come. Simon Willard of the City of Cincinnati, in the County of Hamilton and State of Ohio, sends Greeting — Be it Known that I the said Simon Willard have Invented, constructed made and put into operation a new and useful improvement, which consists in the application of revolving cutters, a cylinder and machinery impelled by band and pulley, connecting its motion with that of any sufficient wheel, forced by steam or other power, to the new and useful purpose of cutting Plasterers Laths, in a manner never before in useful operation; as by me applied and set forth in the following specification, which I have constituted and called a new and useful revolving Lath cutter.

This machine is constructed and applied by me to the new purpose of cutting plasterers Laths, by cutters fastened upon a revolving cylinder, consists of a supporting frame a horizontal driving shaft, a weighty cylinder, and one or more revolving cutters, and other machinery requisite for the operation of the same as the forms and relative positions of the several parts are herein after specified — The length, diameter, and weight of the cylinder depends in some degree upon the number of revolving cutters used, and upon the length, width, and thickness of the laths they are forced to cut. But for a machine suitable for cutting Laths four feet in length, one inch wide, by a fourth thick, the dimensions and proportions are nearly as follows. That is to say, that the supporting frame is eight feet in length five and a half wide, and about four feet high, whose timbers are five inches thick, by two or

X6969 fifteen wide framed edgewise together. These two beds or side frames, are framed to the ends of three cross timbers. Or the frame is shaped to support the operation of the machinery in any manner and according to the circumstances of the Building or the place where it is established most convenient for removing the laths.

The driving Shaft is six and a half feet in length, and if made of cast iron, the turned bearings are three inches in diameter, revolving within a pair of closely adjusted iron boxes, supported about four feet high by the side timbers of the supporting frame, with a square near one end of the shaft, upon which a driving pully is fixed by the side of a loose pulley, and if desired a tending pulley is fastened upon the opposite end. These pullies are outside of the supporting frame. The cylinder is about five feet in diameter composed of heavy seasoned timber, four and a half feet in length including at each end, the edge of a broad rim of an upright cast iron wheel with strong arms extending from hubs fastened upon the driving shaft next to the bearings. Tapering iron keys or wedges about an inch broad are driven lengthwise in gaines and crosswise in mortises cast through the shaft and hubs. all the staves are forced together and held with dowel pins. Or held by their ends inserted and pinned through holes cast in the wheel rims and also held within a pair of broad circular grooves, extending round between an outer and an inner circular flange cast on the inside face of the rims of both upright wheels. The enclosure of this hollow cylinder, whether it consists entirely of iron or of wood, when required to drive but one revolving cutter should weigh about eight hundred pounds, unless a balance wheel be connected with the motion of the driving shaft as a substitute to any want of that weight which is required to give sufficient momentum to the cylinder when making about forty revolutions a minute and cutting one lath each without checking its motion. which momentum of the cylinder is required to be increased by weight according to the

X6969 number of cutters it is forced to drive. When cast iron wheels
cannot be conveniently had the cylinder may consist of a solid or
or hollow log. or it may be composed of circular wooden heads, with
the staves fastened round their extremities. by means of a pair of
sufficient Iron hoops being driven upon their ends with the shaft
fastened within their centre. Or the heads of the cylinder may be
made of thick plank equal in diameter length to the diameter, halved
crosswise together at their centre; through which the shaft passes, on
which shaft these heads are fastened at each end of the cylinder.
These crossed planks or heads constitute four pair of arms, and sup
port upon their extremities, four thick plank. parallel to the shaft.
Upon the outside of each or any one or more of them, one cutter
is bolted. And to complete the cutter cylinder other timbers of
sufficient weight, and of the required curved form, are bolted
and held by a pair of hoops, or otherwise fastened to and between
the arms and plank which support the cutters.

The revolving cutters are made of good tough iron, and hardened
steel, and each may consist of parts or be made the whole length
of the cylinder. four or five inches broad. and about half an
inch thick at the back; tapering to a thin sharp edge (it is
adjusted by screws to cut precisely in the direction of the circle
it describes, just clearing the body of the cutter) Their edges ex-
tend as far beyond the gage of the cylinder as to admit the thick
ness the laths are required to be cut (which gage is the smoothly
turned outside of the cylinder; or polished hoop iron fastened
by countersunk screws round it.) The backs of the cutters are
imbedded for support against a square rabited shoulder (of thin
iron if necessary) made the whole length of the cylinder in which
they are held fast, by means of iron screw bolts which pass through
the centre of the cutter two eight inches apart with countersunk
heads let in even with the outer face. and passing through the stave
wheel rims, and flanges (and inferior iron hoops or transverse curved supporters when requiring their support ) by means of nuts being screwed on the interior end of the bolts by which the cutters are firmly held from springing when cutting the Laths. Previous to bolting on the cutters a sufficient space is made between the fore part of them and the cylinder, for the admission and free discharge of the laths the same way they come in from the boards edge to fall before the slower descent of the revolving cutter (which laths may be forced out by springs if the motion is great). The cutters are fastened on the cylinder a little inclined, consequently so spiral that their revolving edges will coincide with the straight horizontal acute corner of an iron bar imbedded, and fastened along the upper inside corner of a substantial girt of the supporting frame as near to it as can well be without danger of contact.

When the laths are required to be sawed off by the same machine any required number of short curved segments of a suitable circle of a saw are fastened, with the teeth extending outwards, upon the outer surface of the cylinder, just before the cutter at such distances from each as the length of the laths require to be cut. Projecting no further from the face of the cylinder than to just saw sufficiently deep into the edge of the long board as may be required to cut each lath entirely off before they become cut lengthwise by the cutters. The fore ends of each of these circular saw segments terminate close at the surface of the cylinder, gradually increasing in width towards their back ends, which reach to within a few inches of the cutters edge to give room for the shortly sawed laths to fall free of any interference of the saw. For sawing off the laths or other useful pieces, immediately before cutting them lengthwise of any suitable length or breadth for various uses, the cylinder may consist of flat rimmed iron wheels of equal size from two to four feet in diameter, fastened upon the shaft in a manner calculated to be moveable along it. They are screwed or wedged fast at any required dis lance from each other for their rims to support, by means of screws
the curved segments of circular laws on their edge or centre
of them, or the saws may be held fast between pairs of them by
screwing their rims together.

This machine is put together into operation by means of a moving
band connecting the driving pulley of the horizontal shaft with
the motion of any sufficient drum or wheel impelled by steam or
other power while the lath board previously prepared not
exceeding the length of the cylinder is, introduced by the tender
edges between the fixed and revolving cutters which cut and
throw the long or short lath convenient for bunching. Or they are cut
to fall upon a moving canvass, or ropes, which may be applied to
remove them from beneath the cylinder to fall into a measure as re
quired for adjusting their quantity into uniform parcels, which can
vass or ropes are impelled round a pair of revolving rollers by
means of a moving band and pulley upon one of their shafts con
necting its motion with that of the tending pulley before men
tioned. To give the tender time to pick up his board in readiness
while another board is cutting a pair of horizontal vices constituting a feeding
carriage may be made to grip and hold fast the boards edge and
advance the same between the cutters. This carriage consists of a
pair of under jaws of the vices framed parallel to each other
upon the ends of a sufficient girt parallel to and level with the cut
ter beam, and moves back and forth upon a pair of supporters. The
upper jaws of these vices turn upon a pair of joints near their front
ends, which consist of a pair of short flat sleds framed in mor
tices made in the under jaws with their upper ends extending loosely
in mortices made in the upper jaws directly above through each of
which a round iron pin is fitted upon which the upper jaws turn.
Their back ends having leverage sufficient are pressed apart by
a pair of upright screws completing the vices required for hold
ing the boards edge in two places within iron teeth of their jaws.

X6969 the under jaws of this carriage while the board is held in the vices ( and pressed closely upon the cutter beam under a pair of cross bars acted upon by springs, or a pair of lever weights ) are advanced within a pair of square notches made transversely across the cutter beam, at which the fixed cutter terminates on each side to allow the jaws of the vice to advance close to the revolving cutters. The moving carriage of the vices is advanced with the board any distance the return of the cutters require the thickness of the laths to be cut (by hand or) by means of a pair of straight racks fixed to the underside of the vice jaws mashing in a pair of pinion wheels fixed upon a horizontal feeding shaft beneath, which is forced slowly around by band and large sliding pulley connected by band with small tending pulley of the main shaft. By a sufficiency of pulley gearing or worm and teethed wheel, the motion of the feeding shaft is reduced to advance the board to any required thickness of laths.

To effect the alternate vibration of the carriage; a smooth round hole is made through the sliding pulley which has a small grooved wheel with a pair of projecting side catches, on one side of it. This grooved wheel revolves, between the forks of a forked lever by which the sliding pulley is forced by the hand of the tender to slide one inch back and forth along the feeding shaft thereby to catch and advance the carriage by means of the projecting side catches of the grooved wheel catching in another pair of like side catches fixed upon the feeding shaft. When the lath board is cut into laths it is unshipped for the carriage to recede in readiness for another board by descent of a sufficient weight suspended by a rope which winds round a barrel fixed upon the feeding shaft, and thereby raising the weight by its power for that purpose.

I have for the purpose of enabling others skilled in the art of machine building explained the ~~several~~ similar modes of constructing machinery for putting the principle of my invention into useful ope

X6969 ration, and set forth that the several parts may be of various
dimensions. And I have calculated also that they may be
made either of wood, or iron or of both, as far as practicable
and to be made larger or smaller, and the proportions varied from
those of the foregoing descriptions, not only because the laths may re
quire different lengths and breadths, but that the most durable
kind of materials and means may be had in all places where
it may be built and put into operation.
For further understanding the principle of my invention set
forth in this specification references may be had to the following
drawings and written references, to the several parts of the machine
ry, as appears represented upon a scale of about one fourth of
an inch to the foot.
C.C. sills of the supporting frame, A.A. upright posts. D one
of the inclined beams framed into the sills and posts. F one of the
lower timbers framed into the sills. O horizontal girt supporting
the iron bar. G.G. Rollers round which the canvass is impelled
to move. B. the hollow cylinder. A the revolving cutter. K the
fixed iron bar fastened to the girt. H. the loose pulley. I the
driving pulley whereon the moving board is forced to drive the
machinery when in operation.
As my right of the invention of this new and useful improvement which
I have made known, constitute and called a revolving Lath Cutter, I
claim the application of the combination of revolving cutters, a cylinder
and machinery as the accompanying drawings and specification herein
before fully and plainly represent, as applied by me to the new and use
ful purpose of cutting Plaster Laths of boards and slabs in a man
ner never before in useful operation, and I claim for myself my
Heirs administrators and assigns the full and exclusive right and liberty
of making constructing using and vending to others to be used my said
new and useful Invention within the United States for the term of
fourteen years according to Law for that [illegible] made and provided.

646 X6969

In testimony that the foregoing is a true specification and designation of my claim of said new and useful invention, I have hereunto subscribed my name the twenty eighth day of January Eighteen hundred and thirty two —

Attest { Nathaniel Holley
Joseph M. Huston

Simon Willard

Fee

PAT 2512 [illegible]

Patented 16th March 1832